(12) United States Patent
Harvey

(10) Patent No.: US 6,179,036 B1
(45) Date of Patent: Jan. 30, 2001

(54) AUTOMATIC OVERHEAD DOOR OPENING SYSTEM WITH DUAL MOTOR DRIVE AND AUTOMATIC DOOR LOCK

(76) Inventor: Rémy Harvey, 3450 Rue Du Sommet, Lac Kenogami Quebec (CA), G7X 7V6

(*) Notice: Under 35 U.S.C. 154(b), the term of this patent shall be extended for 0 days.

(21) Appl. No.: 09/360,988
(22) Filed: Jul. 26, 1999
(51) Int. Cl.⁷ ..................................................... E05F 11/00
(52) U.S. Cl. ........................... 160/188; 160/189; 49/199
(58) Field of Search ................................. 160/7, 188, 189, 160/191, 193, 133, 201, 312, 321; 296/50, 51; 49/199

(56) References Cited

U.S. PATENT DOCUMENTS

| | | | |
|---|---|---|---|
| 4,047,441 | * | 9/1977 | Kellogg .............................. 160/189 X |
| 4,191,237 | * | 3/1980 | Voege ..................................... 160/188 |
| 4,597,428 | * | 7/1986 | Iha ......................................... 160/188 |
| 4,706,727 | * | 11/1987 | Leivenzon et al. ................... 160/188 |
| 4,821,456 | * | 4/1989 | Nogaki ................................ 49/199 X |
| 4,860,813 | * | 8/1989 | Ballyns ................................. 160/188 |
| 5,056,847 | * | 10/1991 | Stillwell ................................ 296/50 |
| 5,139,075 | * | 8/1992 | Desrochers ....................... 160/188 X |
| 5,195,390 | * | 3/1993 | Nogaki ................................ 74/89.15 |
| 5,221,869 | * | 6/1993 | Williams et al. .................. 49/199 X |
| 5,557,887 | * | 9/1996 | Fellows et al. .................. 160/188 X |
| 5,931,212 | * | 8/1999 | Mullet et al. ........................ 160/188 |

* cited by examiner

*Primary Examiner*—Bruce A. Lev
(74) *Attorney, Agent, or Firm*—Swabey Ogilvy Renault; Guy J. Houle

(57) ABSTRACT

An automatic overhead door opening system for a transport container whereby to operate the displacement of a panel door from a closed position to an open position. The system is housed in a restrained size housing which incorporates a motorized drive for driving an endless chain associated with an elongated central guide track on which the door is guidingly attached. The motorized drive is comprised of two small d.c. motors each having a drive gear drivingly coupled to a common driven gear of a gear drive which includes a worm gear in meshing engagement with a driven sprocket connected to a drive sprocket to displace the endless chain. The housing is of reduced thickness and access to the interior of the housing is provided through a non-obstructed removable bottom wall plate and accordingly it is not necessary to disconnect the endless chain and drive sprocket to have access to the components of the system. The drive can also be operated from the cabin of a motorized vehicle incorporating a transport container or remotely from a hand-held transmitter unit or by a control secured to an outside wall of said box and energized from inside the cab by authorized operator.

9 Claims, 3 Drawing Sheets

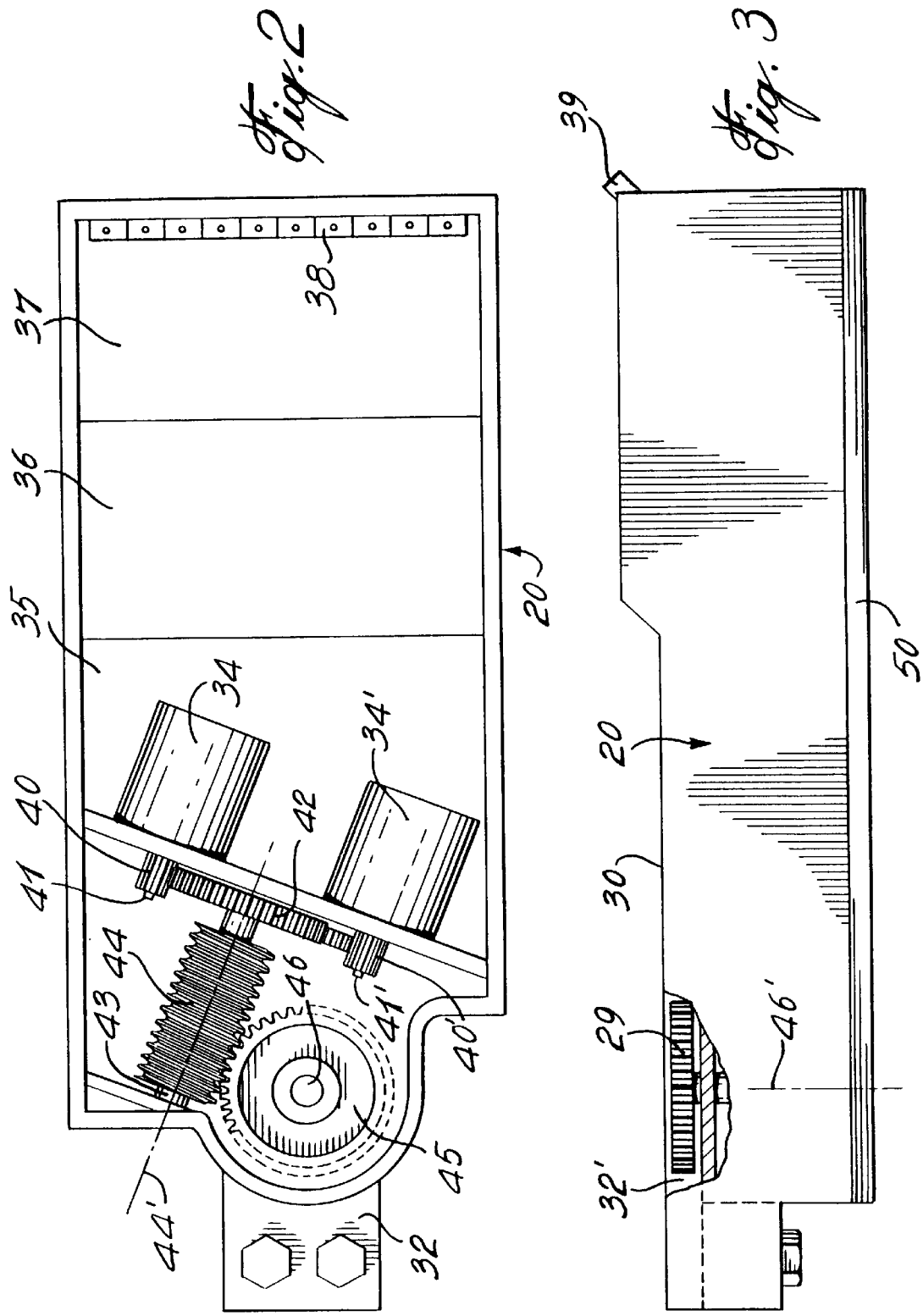

AUTOMATIC OVERHEAD DOOR OPENING SYSTEM WITH DUAL MOTOR DRIVE AND AUTOMATIC DOOR LOCK

FIELD OF THE INVENTION

The present invention relates to an automatic overhead door opening system for a transport container, such as the box container of a tractor-trailer transport vehicle. The door opening system is contained within a restrained size housing which incorporates therein two small d.c. motors which are gear-coupled to a drive train to displace a door constructed of folded panels, from a closed position to an opening position while also providing a locking feature for the door.

BACKGROUND OF THE INVENTION

In the prior art there is disclosed various automatic door opening systems for garages and for vehicle transport box-like container bodies. Such a mechanism is for example disclosed in U.S. Pat. No. 5,056,847 granted on Oct. 15, 1991. In that patent there is described a system which is quite complex in construction and which is operated from a single side of the door by a fairly large reversible electric motor which is mounted vertically along a side wall of the container. The fact that the motor and drive are located on one side of the door causes an imbalance of the load which may cause the door to jam in the track. Also, the motor occupies space which may interfere with the loading and unloading of cargo and therefore is a nuisance and can result in damage to the cargo or the motor. The motor is also exposed to the cargo and can be damaged during transport by shifting cargo when the vehicle is driven over rough roads. These systems are also not practical for installation and maintenance.

SUMMARY OF THE INVENTION

It is a feature of present invention to provide an automatic overhead door opening system for a transport container and which overcomes the above-mentioned disadvantages of the prior art.

Another feature of the present invention is to provide an automatic overhead door opening system for a transport container and wherein the system utilizes a drive which is housed in a restrained size housing which is secured centrally on the top wall of a container and which does not obstruct the charging and discharging of cargo within the container as it occupies a space which is not much greater than the thickness of the folded panel door which is retracted against the ceiling of the container.

Another feature of the present invention is to provide an automatic overhead door opening system for a transport container and wherein the system is easy to install, easy to service, simple, and which may be operated from the cab of the transport vehicle, or from a control box on the side of the container but made operational by a switch inside the cabin and operated by the conductor or remotely by a hand-held remote control.

Another feature of the present invention is to provide an automatic overhead door opening system for a transport container and wherein the system incorporates a gear train which locks the folded panel door at any arrested position thereby eliminating the need for an anti-theft system.

Another feature of the present invention is to provide an automatic overhead door opening system for a transport container and wherein the drive of the system as well as its magnetics and electronic control circuitry are protected in individual compartments of a protective housing of reduced size.

Another feature of the present invention is to provide an automatic overhead door opening system for a transport container and incorporating a drive consisting of two small d.c. motors of reduced size and having a unique gear coupling capable of displacing any door assembly and achieving a door displacement of about 1 ft/sec.

Another feature of the present invention is to provide an automatic overhead door opening system for a transport container and wherein the housing is only slightly thicker than the folded panel door when retracted against the ceiling of the container and wherein the system has a long life and improved reliability while incorporating a simple construction and adaptable to existing chain drive systems and other door closure systems which can be modified.

According to the above features, from a broad aspect, the present invention provides an automatic overhead door opening system for a transport container having an open end selectively closed by a door constructed of folded panels and guided between opposed guide rails for displacement from a closed position, to obstruct the open end, and an opened position where the door is positioned adjacent a top wall of the container. A motorized drive is provided for driving an endless chain secured between a drive sprocket and an idler sprocket. An elongated central guide track is associated with the chain. A trolley is secured to the chain and guidingly and displaceably secured to the track. The track is secured adjacent a top wall of the container and substantially central therewith. A connecting arm interconnects a top central connection of the door with the trolley for displacing the door in a guided manner between the guide rails. The motorized drive is mounted adjacent the top wall in a restrained size housing occupying a restrained space adjacent the top wall. A chain drive sprocket is mounted adjacent a top wall of the housing. The endless chain is in engagement with the chain drive sprocket. A driven sprocket is secured to a common driven shaft with the chain drive sprocket. A pair of d.c. motors, of reduced size, are mounted in the restrained size housing. The motors each have a drive gear which is drivingly coupled to a common driven gear of a gear drive including a worm gear in meshing engagement with the driven sprocket. The gear drive also arrests the door in a lock state when the motors are de-activated. A non-obstructed removable bottom wall plate is secured to the housing for access to the interior of the housing from below the housing.

BRIEF DESCRIPTION OF THE DRAWINGS

The preferred embodiments of the present invention will now be described with reference to the accompanying drawings in which

FIG. 2 is a bottom view of the restrained size housing of the overhead door opening system with the bottom wall plate removed;

FIG. 3 is a side view of FIG. 2; and

DESCRIPTION OF PREFERRED EMBODIMENTS

Figure 1:
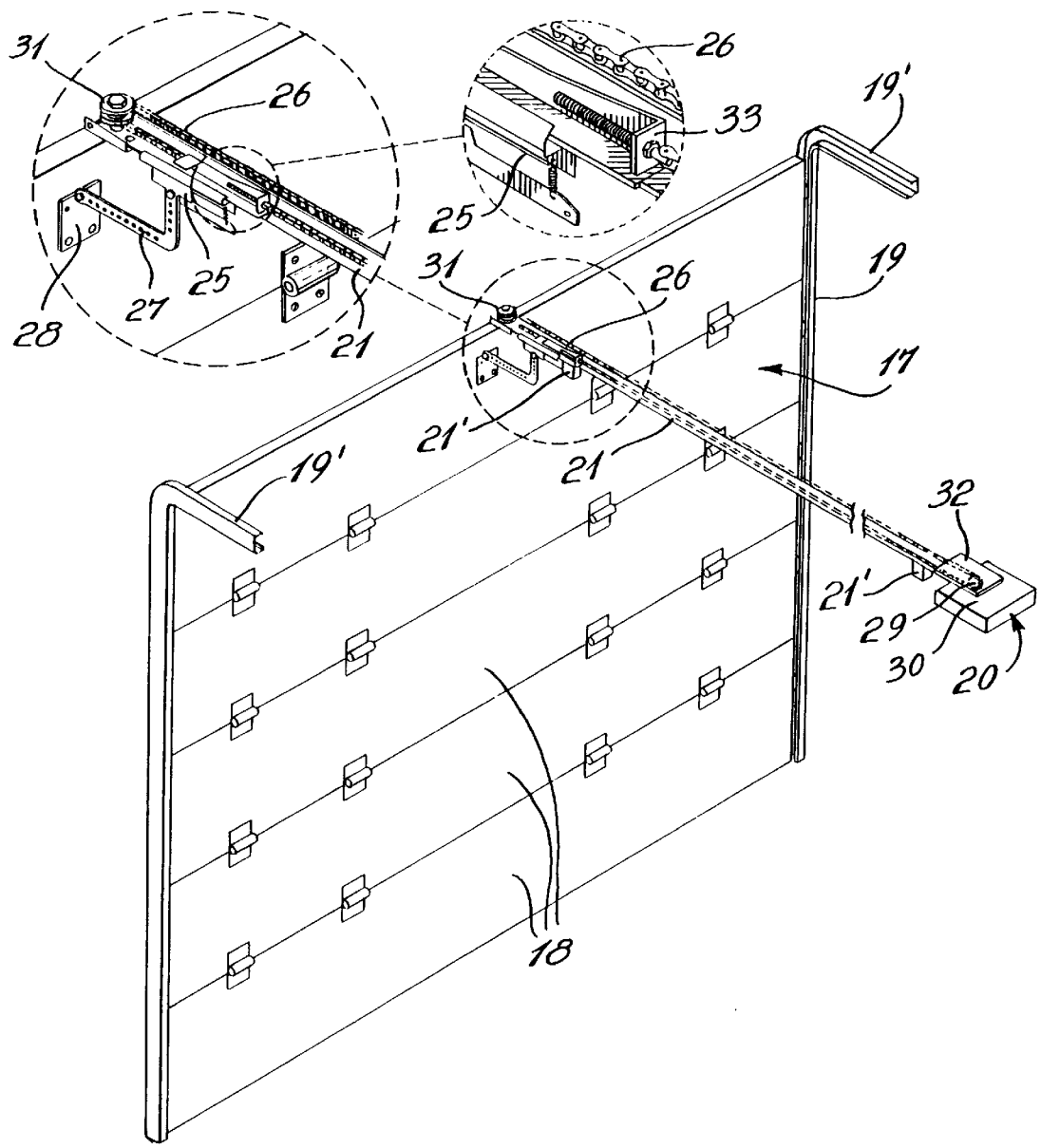
FIG. 1 shows the automatic overhead door opening system of the present invention adapted to a door opening and closing mechanism of a transport container, herein a transport box of a motorized vehicle and having sections thereof enlarged to better illustrate the construction of the mechanism.
Figure 4:
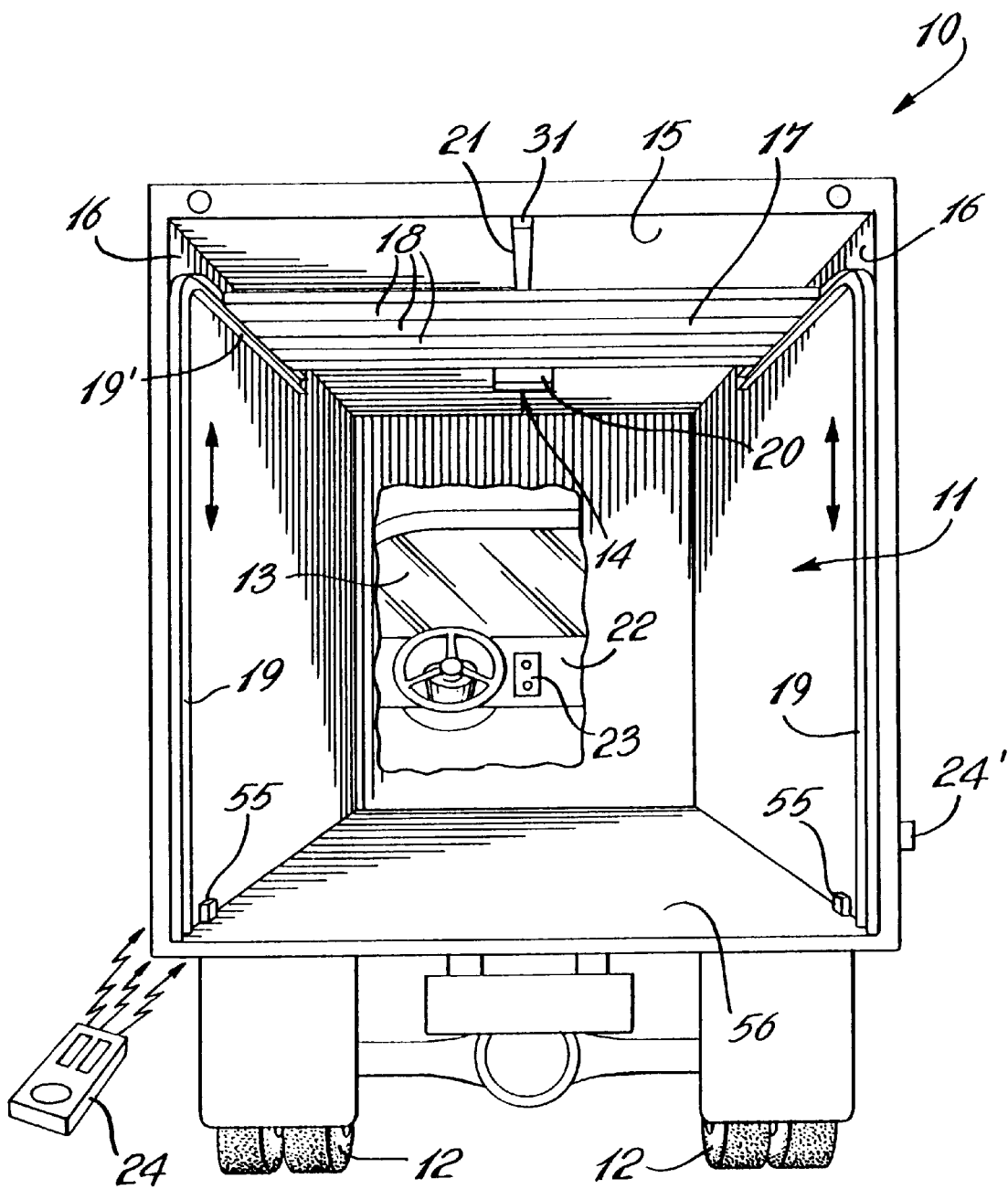
FIG. 4 is a rear view of a transport truck, partly fragmented and showing the disposition of the automatic overhead door opening system of the present invention relative to the top wall of the transport box as well as showing the position of the controls to operate the motor drive of the system.

Referring now to the drawings and more particularly to FIG. 4 there is shown generally at 10 a transport vehicle having a box container 11 mounted on wheels 12 and connected to a motorized cab 13. The automatic overhead door opening system of the present invention is generally indicated by reference numeral 14 and is mounted centrally on the top wall 15 of the box container 11. The box container has a rear open end 16 which is closable by a door 17 which is constructed of folded panels 18 and which is herein shown in a retracted position against the top wall 15 of the container. The folded panel door 17 is guided between opposed guide rails 19 to displace the door from a closed position as shown in FIG. 1, where the door obstruct the rear open end 16 and to an opened position, as shown in FIG. 4, where the door is positioned adjacent the top wall 15 of the container. The motorized drive, the magnetics and the radio control electronics of the system are housed in compartments of a restrained size housing 20 which is secured to the top wall 15 centrally therewith and aligned with a guide track and endless chain assembly 21 also centrally secured to the top wall 15 as will be described with reference to FIG. 1.

The drive which is housed in the housing 20 may be operated from the dashboard 22 of the motorized cab 13 by switches 23 or by a hand-held remote control transmitter unit 24 or by a control 24' (see FIG. 4) usually secured to the outside wall of the container and activated by the operator inside the cabin. Accordingly, there is no need for switch controls to be secured to the exterior of the vehicle 10 and this provides added safety.

Referring now to FIG. 1 there is shown the construction of the door opening system. As hereinshown the system is comprised of a straight track 21 which is secured adjacent the top wall 15 of the vehicle container and disposed centrally thereof whereby to displace a trolley 25 which is secured to a drive chain 26. A connecting arm 27 interconnects the top central connecting plate 28 of the door 17 with the trolley 25 for displacing the door in a guided manner between the guide tracks 19. Limit switches 21' are provided to stop the motors at the maximum travel of the trolley on the track to open or close the door. The tracks have a straight ceiling section 19' which extends close to the top wall 15 of the vehicle container whereby the door may be restrained in a space of about 2 inches to 2½ inches from the top wall 15.

As previously described the motorized drive is located in a restrained size housing 20 which is also secured centrally on the top wall 15 of the vehicle container by mounting means, not shown. A drive sprocket 29 is located within a depression 32' formed in the top wall 30 of the housing 20 and the endless chain 26 is disposed about the drive sprocket. An idler sprocket 31 located and secured to the other end of the track 21. The housing 20 is provided with a rail mounting bracket 32 to secure the track 21 thereto. The housing 20 and drive sprocket 29 are secured in alignment with the track 21. The trolley 25 is secured to the endless chain 26 by an adjustment bracket 33 to maintain the endless chain taught and to loosen the chain to provide ease of mounting thereof about the drive sprocket and the idler sprocket.

Referring now to FIGS. 2 and 3 there will be described the construction of the motorized drive. As previously described an important feature is that the housing containing the chain drive be constructed as thin as possible not to cause any obstruction to cargo disposed in the shipping container. This is achieved with the present invention by the construction of a non-conventional motorized drive. As hereinshown the drive is comprised of a pair of small d.c. motors. The motors herein utilized are 0.295 hp motors which operate on the twelve volts d.c. battery of the vehicle. Alternately, if the container is a shipping container it may have incorporated therewith a battery supply or may be connected to an external d.c. supply. The housing 20 is divided in three compartments and as hereinshown a motorized drive compartment 35, an electronic circuit compartment 36, and a radio control compartment 37 which houses the electronic receiver circuit associated with the hand-held transmitter unit 24. An electrical bus 38 is provided in the compartment 37 and from which the internal wiring is connected. A cable entry port 39 is also provided adjacent the bus 38 whereby to receive the power from the vehicle battery as well as the wiring to the dashboard switch 23 of the vehicle cab.

As shown in FIG. 2 each of the motors 34 and 34' have a small drive gear 40 and 40' connected respectively to their drive shafts 41 and 41' and these drive gears are coupled in toothed engagement with a large common driven gear 42. The drive gears 40 and 40' are disposed on a diametrical axis of the common drive gear.

The common driven gear 42 is coupled to a shaft 43 to impart rotation thereto and to a worm gear 44. The worm gear 44 is in meshing engagement with a driven sprocket 45 which is secured to a drive shaft 46 to which the drive sprocket 29 is secured. As shown in FIG. 3, and previously mentioned, the drive sprocket 29 extends above the top wall 30 of the housing 20.

The housing 20 is also provided with a non-obstructed removable bottom plate 50 which is secured thereto to provide easy access to the interior compartments of the housing and from below the housing. Accordingly, the components parts in the housing can be serviced without having to remove the chain drive and his can be done simply from underneath the housing while it is installed in the container.

The gearing arrangement as hereinshown also provides a locking feature for the door when it is arrested at any position. This is achieved through the meshing engagement of the gears and the disposition of the worm gear 40 with its long axis 44' extending transverse, at 90°, to the drive axis 46', as shown in FIGS. 2 and 3. Accordingly, when the motors are idle the gear train will provide a lock for the door and it will not be possible to move the door by hand on the rails 19, as shown in FIG. 2. The common driven gear has a diameter which is much greater than the diameter of the drive gears 40 and 40' and the gearing ratio is very large. The worm gear and driven gear arrangement as well as the disposition of the motors with respect to the common driven gear, also makes it possible to utilize the small motors and thereby achieve a substantial space reduction to achieve such a small housing.

The restrained size housing 20 as a total thickness which does not exceed 3¼ inches and has a flush bottom plate 50 not to obstruct any cargo placed within the container. The motorize drive, as herein disclosed, is a heavy duty drive having a lifting force of about 195 lbs, through its gear coupling, and a chain displacement of about 12 inches per second thereby permitting a full door opening in about 7 seconds. Counter-balance coil springs are not always required for these doors which may be of very light weight. Because a lifting force is exerted on the center of the door it offers optimum balance and stability of the door tracking and lifting. Although not shown the receiver circuit which is in the housing 20 is also provided with an automatic resetting circuit protector. The housing in the preferred embodiment constructed is also 5⅞" wide and 13¾" long and weights about 21 lbs. The housing is constructed of aluminum and may be mounted in a dry freight or refrigerated freight container. The motors are also capable of operating doors up to at least 96" high. As also mentioned above, it is no longer necessary to have a manual door latch on the door of the vehicle as the motor gear train provides the locking mechanism. This deters theft. It is also possible to adapt the present door opening system to existing vehicle container doors and no special tools are required to do the installation. Photocells 55, as shown in FIG. 4, may be mounted in the container near the bottom wall 56 thereof and on each of the door 17 to detect any obstruction and to shut off the motor drive to stop the door from closing and causing damage.

It is within the ambit of the present invention to cover any obvious modifications of the preferred embodiment described herein, provided such modifications fall within the scope of the appended claims.

What is claimed is:

1. An automatic overhead door opening system for a transport container having an open end selectively closed by a door constructed of folded panels and guided between opposed guide rails for displacement from a closed position to obstruct said open end, and an open position when said door is positioned adjacent a top wall of a container; a motorized drive for driving an endless chain secured between a drive sprocket and an idler sprocket, an elongated central guide track associated with said chain, a trolley secured to said chain and guidingly and displaceably secured to said track, said track being securable adjacent a top wall of a container and substantially central therewith, a connecting arm interconnecting a top central connection of a door of a container with said trolley for displacing said door in a guided manner between said guide rails, said motorized drive being mounted in a restrained size housing with said housing dimensioned to occupy a restrained space adjacent a top wall of a container, a chain drive sprocket mounted adjacent a top wall of said housing, said endless chain being in engagement with said chain drive sprocket, a driven sprocket secured to a common driven shaft with said chain drive sprocket, and a pair of d.c. motors of reduced size mounted in said restrained size housing, said motors each having a drive gear drivingly coupled to a common driven gear of a gear drive including a worm gear in meshing engagement with said driven sprocket, said gear drive arresting a door of a container in a locked state when said motors are de-activated, and an unobstructed removable bottom wall plate secured to said housing for access to the interior of said housing from below said housing.

2. An automatic overhead door opening system for a transport container as claimed in claim 1 wherein said drive gears are stationary gears disposed in meshing toothed engagement on a diametrical axis of said common driven gear, said common driven gear having a diameter much greater than the diameter of said drive gears.

3. An automatic overhead door opening system for a transport container as claimed in claim 2 wherein said worm gear is connected to a central driven shaft of said common driven gear and disposed in toothed engagement at an angle of 90° with said driven gear, said driven gear and worm gear coupling when stationary providing said arresting of a container door.

4. An automatic overhead door opening system for a transport container as claimed in claim 1 wherein said d.c. motors are 0.295 horsepower motors which operate on a 12 volts d.c. battery.

5. An automatic overhead door opening system for a transport container as claimed in claim 1 wherein said restrained size housing is further provided with compartments for housing magnetic and radio control circuits associated with said motorized drive and also accessible by removal of said bottom wall plate.

6. An automatic overhead door opening system for a transport container as claimed in claim 5 wherein said housing is further provided with a track connecting bracket to automatically align said housing and chain drive sprocket with said track.

7. An automatic overhead door opening system for a transport container as claimed in claim 1 wherein said guide rails are securable on opposed sides of a container and adjacent a top wall thereof whereby to guide a door of said container in a restrained space of about 2 inches to 2½ inches from a container top wall.

8. An automatic overhead door opening system for a transport container as claimed in claim 7 wherein said housing is secured to a container top wall in alignment with said track, said restrained size housing having a total thickness not exceeding 3¼" to maintain a storage space of a container at a maximum height.

9. A transport vehicle comprising a motorized cab and a transport box having a rear open end provided with a door incorporating an automatic door opening system and door structure as defined in claim 1, and wherein switch means is provided in a cab for operating said motorized drive from said cab, and a hand-operable remote control for operating said motorized drive remotely of a vehicle or by a control securable to an outside wall of a transport box and energized from inside a cab by an authorized operator.

\* \* \* \* \*